(12) United States Patent
Zhang et al.

(10) Patent No.: US 9,046,261 B2
(45) Date of Patent: Jun. 2, 2015

(54) LCD SHOWER

(71) Applicants: Huasong Zhou, Xiamen (CN); XIAMEN SOLEX HIGH-TECH INDUSTRIES CO., LTD., Xiamen, Fujian (CN)

(72) Inventors: Mingfu Zhang, Xiamen (CN); Tao Cai, Xiamen (CN); Xianguo Zou, Xiamen (CN); Huasong Zhou, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 91 days.

(21) Appl. No.: 13/782,576

(22) Filed: Mar. 1, 2013

(65) Prior Publication Data

US 2014/0029293 A1     Jan. 30, 2014

(30) Foreign Application Priority Data

Jul. 30, 2012   (CN) .......................... 2012 1 0270004

(51) Int. Cl.
```
F21V 33/00      (2006.01)
B05B 1/18       (2006.01)
G01K 1/02       (2006.01)
G01K 13/02      (2006.01)
```
(52) U.S. Cl.
CPC ................. *F21V 33/004* (2013.01); *B05B 1/18* (2013.01); *G01K 1/028* (2013.01); *G01K 13/02* (2013.01); *G01K 2013/026* (2013.01)

(58) Field of Classification Search
CPC ............ E03C 2001/0418; F21V 33/00; F21V 33/0004; F21V 33/004; F21S 10/00; G01K 1/00; G01K 1/02; G01K 1/028; G01K 13/02; G01K 2013/02; G01K 2013/026; B05B 1/18

USPC ................... 362/96, 101, 602; 236/93 B, 94; D23/223; 374/141, 147, 148; 239/18
See application file for complete search history.

(56) References Cited

U.S. PATENT DOCUMENTS

| | | | | |
|---|---|---|---|---|
| 5,160,197 | A * | 11/1992 | Klose ............................. | 374/147 |
| 7,228,874 | B2 * | 6/2007 | Bolderheij et al. ........... | 137/801 |
| 7,252,431 | B1 * | 8/2007 | Caramanna ................... | 374/147 |
| 7,350,973 | B2 * | 4/2008 | Craig et al. .................... | 374/162 |
| D696,383 | S  * | 12/2013 | Miller et al. ................. | D23/223 |
| 2009/0140962 | A1 * | 6/2009 | Hwang et al. ................... | 345/87 |

OTHER PUBLICATIONS

Delta Faucet Company, Masco Corporation of Indiana, Handshower Temp2O model #75628, Specification Catalog, 2013.*

* cited by examiner

*Primary Examiner* — Anh Mai
*Assistant Examiner* — Arman B Fallahkhair
(74) *Attorney, Agent, or Firm* — Rabin & Berdo, P.C.

(57) ABSTRACT

An LCD shower includes a body part with waterway, an information acquisition module, a transparent or semitransparent display module, a CPU connected to the information acquisition module and the display module and a power module to supply power to the information acquisition module, the display module and the CPU; the body part is disposed with a through hole, the display module is assembled in the through hole, wherein the display module includes a LCD screen, a first light guiding panel and a second light guiding panel, the LCD screen is sealed and disposed between the first light guiding panel and the second light guiding panel. User can see the display information of the LCD screen from one side of the first light guiding panel or the second light guiding panel; at the same time, as the display module is transparent or semi-transparent.

12 Claims, 6 Drawing Sheets

LCD SHOWER

FIELD OF THE INVENTION

The present invention relates to an LCD shower.

BACKGROUND OF THE INVENTION

With the development of the shower facilities, to satisfy people's needs, shower as a widely used component has improved greatly. For example, the shower is additional disposed with an LCD unit to display the water temperature, the water flow rate and the water pressure for user acquiring the information conveniently. Refer to the FIG. 7, the LCD unit 200 includes a reflection film 220, a light guiding panel 240, a diffusion barrier 260 and an LCD screen 280 of overlaying in from down to up. The information of the water temperature, the flow rate and the water pressure are displayed on the LCD screen 280, the reflection film 220 is used to reflect the front light, which makes user catching the information on the LCD screen 280 from only one direction. And user can not see the back of the LCD unit 200 through the reflection film 220. So the shower with the LCD unit 200 is of weak visual effect.

SUMMARY OF THE INVENTION

The present invention is provided with an LCD shower with better visual effect and easy usage, which overcomes the disadvantages of the existing technology. The technical proposal of the present invention to solve the technical problem is that:

An LCD shower, which includes a body part with waterway, an information acquisition module, a transparent or semitransparent display module, a CPU connected to the information acquisition module and the display module and a power module to supply power to the information acquisition module, the display module and the CPU; the body part is disposed with a through hole, the display module is assembled in the through hole, the display module includes a LCD screen, a first light guiding panel and a second light guiding panel, the LCD screen is sealed and disposed between the first light guiding panel and the second light guiding panel.

In another preferred embodiment, the display module is a multicolor backlight guiding display module, the color of the display module changes according to the water temperature.

In another preferred embodiment, the first light guiding panel and the second light guiding panel are seal adhered or welded together.

In another preferred embodiment, the space between the first light guiding panel and the second light guiding panel are filled with transparent solid material.

In another preferred embodiment, the opposite sides of the first light guiding panel and the second light guiding panel are separately disposed with a layer of uniform concave-convex spots.

In another preferred embodiment, the body part is disposed with a front surface faced to the user and a back surface back to the front surface, the through hole is running through the front surface and the back surface of the body part.

In another preferred embodiment, the body part includes a body and a cover, the body is fixed to the cover, the body is disposed with a first hole, the cover is disposed with a second hole, the first hole is coupled to the second hole to form the through hole; a clearance is disposed between the periphery of the body corresponding to the first hole and the periphery of the cover corresponding to the second hole, the display module is disposed inside the clearance.

In another preferred embodiment, an O ring is disposed between the body and the display module, an O ring is disposed between the cover and the display module.

In another preferred embodiment, the body part further includes a box body to accept the CPU.

In another preferred embodiment, the power module is disposed in the waterway of the body part to convert the water flow power to electric energy.

Compared to the existing technology, the technical proposal of the present invention has advantages as below:

1. The LCD screen is disposed between the first light guiding panel and the second light guiding panel, user can see the display information of the LCD screen from one side of the first light guiding panel or the second light guiding panel; at the same time, as the display module is transparent or semi-transparent, user can see the back of the display module through itself, so the LCD shower of the present invention is provided with gorgeous visual effect.
2. The display module is a multicolor backlight guiding display module, the color of the display module changes according to the water temperature, so even the bathroom is with too heavy steam to see the temperature value the display module displays, the user can judge the temperature according to the color of the display module, making the LCD shower easy used.
3. The clearance of the first light guiding panel and the second light guiding panel is filled with transparent and solid filler, which improves the sealing performance of the first light guiding panel and the second light guiding panel and is with water proof effect, besides, it will not influence the transparent effect.
4. The opposite sides of the first light guiding panel and the second light guiding panel are separately disposed with a layer of uniform concave-convex spots, which makes the light evenly diffused to the LCD screen and the display screen displayed clear.
5. The throughout hole is running through the front and back surfaces of the body part, as the front surface is faced to the user, user can see the information of the display module and needs no move the view, making the LCD shower easy used.
6. The display module is assembled in the clearance, the first through hole and the second through hole can be held by the first light guiding panel and the second light guiding panel, making sure of the sealing performance of the body part in the throughout hole, it makes the shower with better sealing effect.
7. An O ring is disposed between the body and the display module, and an O ring is disposed between the cover and the display module, which improves the sealing performance and the shock proof effect of the display module.
8. The power module converts the flow rate into electrical energy to supply power to the information acquisition module, the display module and the CPU, which is green energy conserving.

BRIEF DESCRIPTION OF THE DRAWINGS

The present invention will be further descried with the drawings and embodiments.

DETAILED DESCRIPTION OF THE EMBODIMENT

Figure 1:
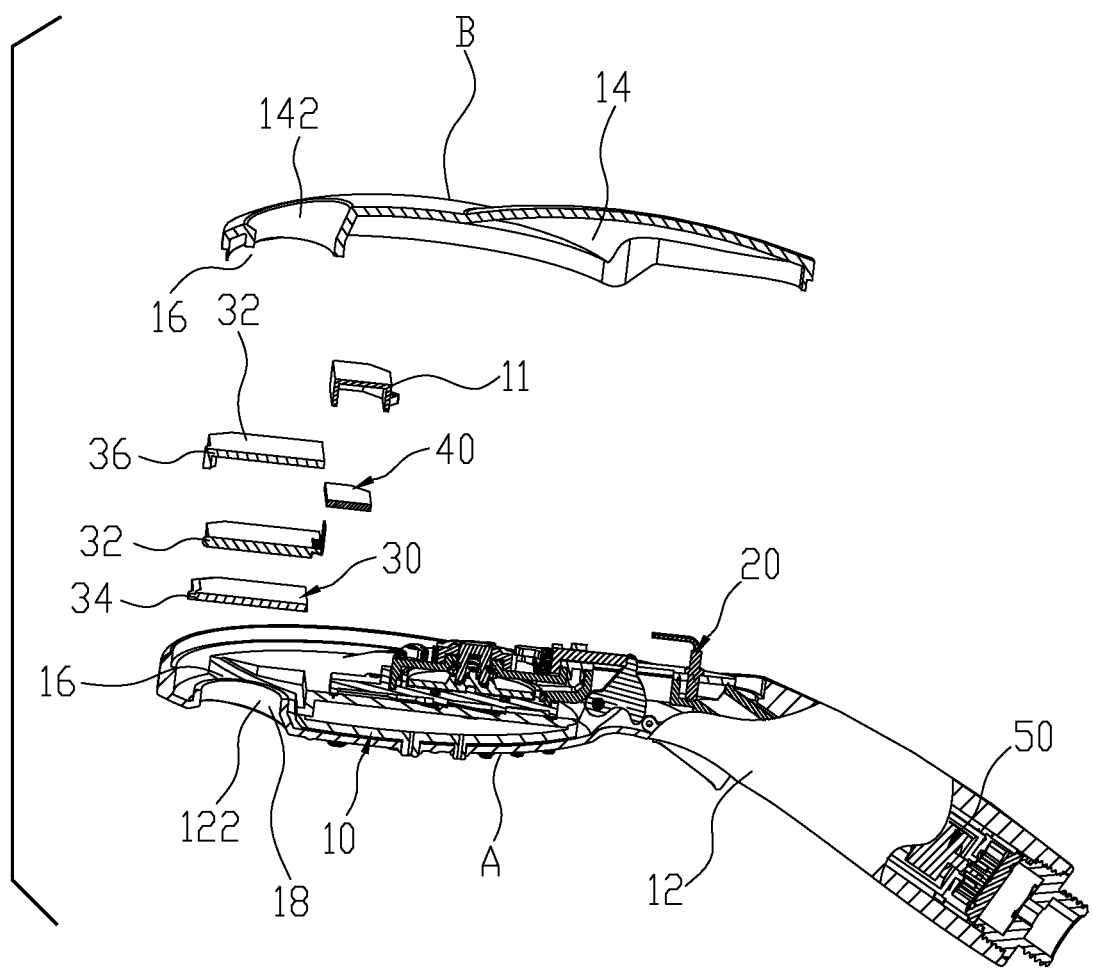
FIG. 1 illustrates the sectional view of the breakdown structure of the LCD shower of the present invention.

Please refer to the FIG. 1. The LCD shower 100 of the present invention includes a body part 10 with waterway, an information acquisition module 20, a transparent or semi-transparent display module 30, a CPU 40 connected to the information acquisition module 20 and the display module 30 and a power module 50 to supply power to the information acquisition module 20, the display module 30 and the CPU 40; the information acquisition module 20, the display module 30, the CPU 40 and the power module 50 are assembled inside the body part 10.

The body part 10 is disposed with a front surface A faced to the user and a back surface B opposite to the front surface. The body part 10 includes a body 12, a cover 14 and a box body 11 to assemble with the CPU 40. The body 12 is fixed to the cover 14. The front end of the body 12 is disposed with a first through hole 122, the front end of the cover 14 is disposed with a second through hole 142. a clearance 16 is disposed between the periphery of the body 12 corresponding to the first through hole 12 and the periphery of the cover 14 corresponding to the second through hole 14. The first through hole 122 and the second through hole 142 are coupled to form a throughout hole 18. The throughout hole 18 is running through the front surface A and the back surface B of the body part 10.

The information acquisition module 20 can be applied with a temperature acquisition module to detect the water temperature or a detecting module to detect the water pressure or flow rate, it can send the signal to the CPU 40.

The display module 30 is a multicolor backlight guiding display module, the color of the display module changes according to the water temperature. The display module 30 includes an LCD screen 32, a first light guiding panel 34 and a second light guiding panel 36. The LCD screen 32 is double displayed. The first light guiding panel 34 is faced and connected to the front surface of the LCD screen 32, while the second light guiding panel 36 is faced and connected to the back surface of the LCD screen 32. The first light guiding panel 34 and the second light guiding panel 36 are seal adhered or welded together. The clearance between the first light guiding panel 34 and the second light guiding panel 36 is filled with transparent and solid filler 35. The opposite sides of the first light guiding panel 34 and the second light guiding panel 36 are separately disposed with a layer of uniform concave-convex spots 37. The concave-convex spots are applied to make the light evenly diffused to the LCD screen 32 to display different color. The LCD screen 32, the first light guiding panel 34 and the second light guiding panel 36 are transparent. In unused condition, the display module 30 is transparent so that user can see the back of the display module 30 through the first light guiding panel 34, the LCD screen 32 and the second light guiding panel 36. In used condition, the LCD screen 32 is transparent expect the display part of the LCD screen 32. So the LCD module 30 is semi-transparent while in work.

The CPU 40 is applied to drive the display module 30 to display the information the information acquisition module 20 detects. The CPU 40 is disposed with light resources with different color (which is not figured out in the drawings), the light of the light resource lights up the display module 30 to make it display different color. For example, when the water temperature is high, the light resource gives off red to make the display module 30 glowed red; when the water temperature is low, the light resource gives off blue to make the display module 30 glowed blue.

The power module 50 is applied to supply power for the information acquisition module 20, the display module 30 and the CPU 40. The power module 50 is converted the water flow of the body part 10 into electrical energy.

Figure 2:
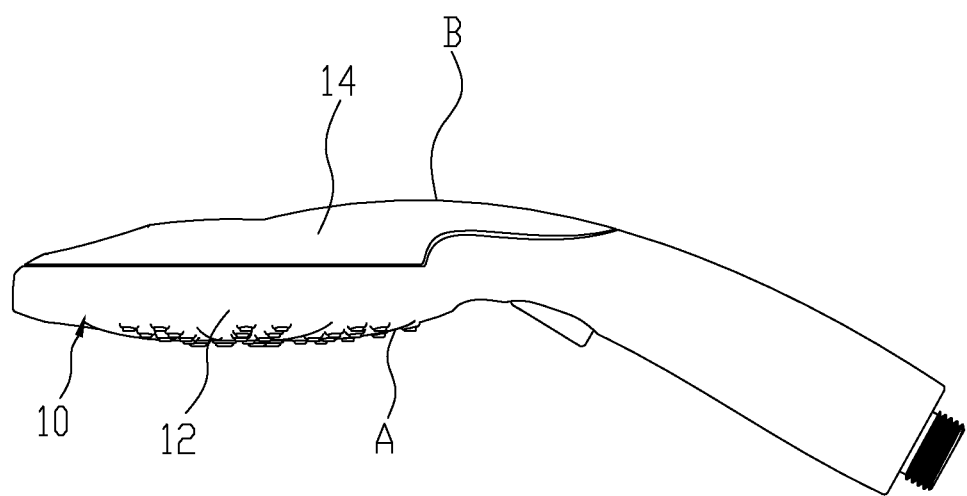
FIG. 2 illustrates the structure of the LCD shower of the FIG. 1.
Figure 3:
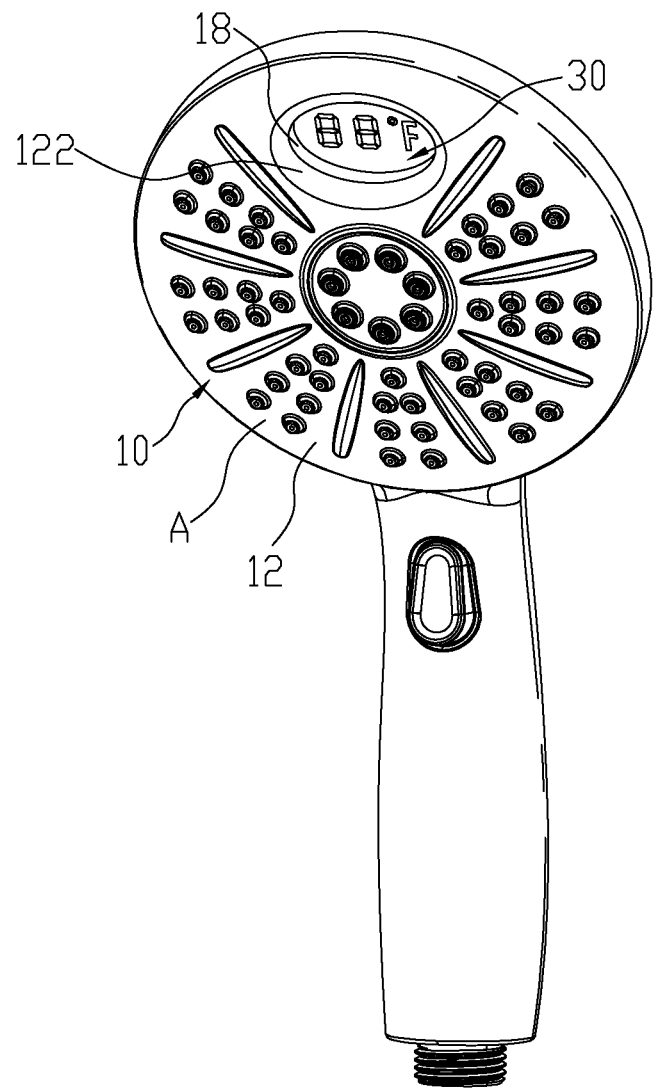
FIG. 3 illustrates the structure of the LCD shower of the FIG. 1 in another angle of view.
Figure 4:
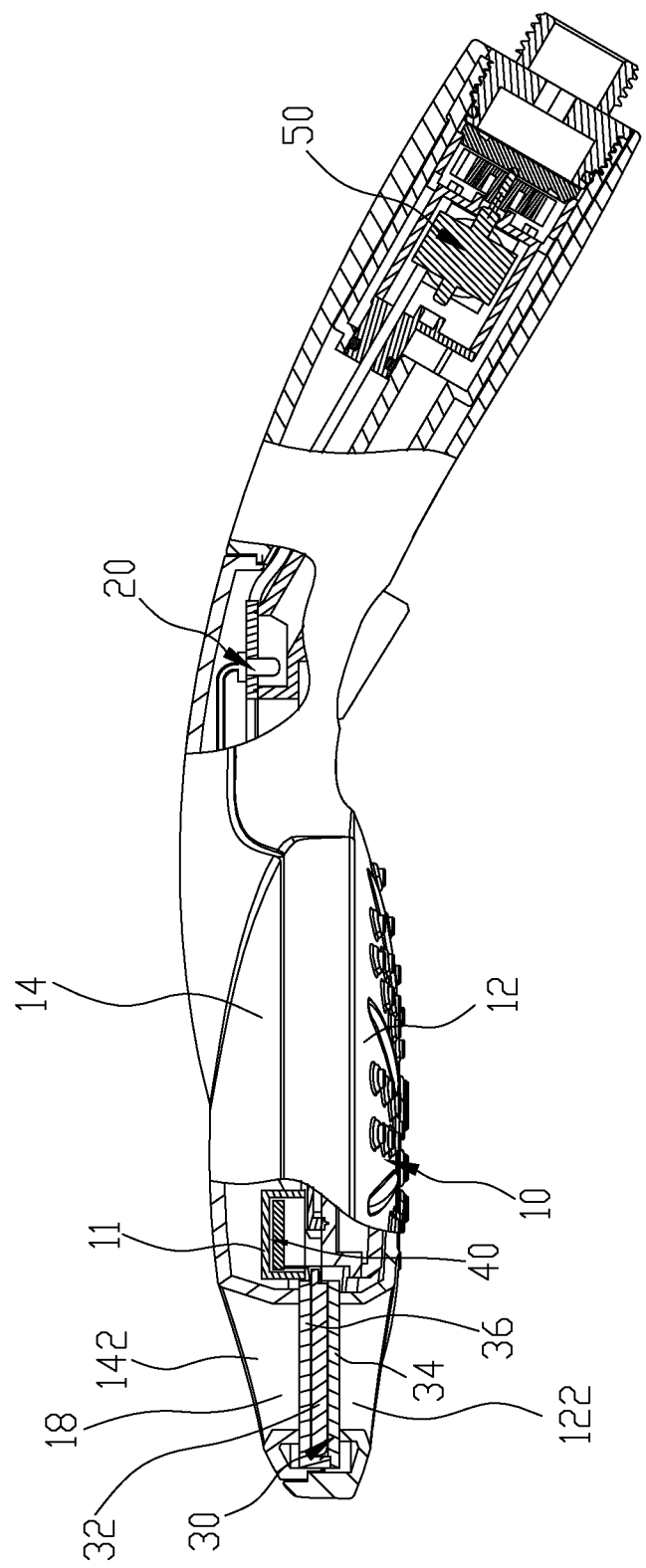
FIG. 4 illustrates the partial sectional view of the LCD shower of the FIG. 1.
Figure 5:
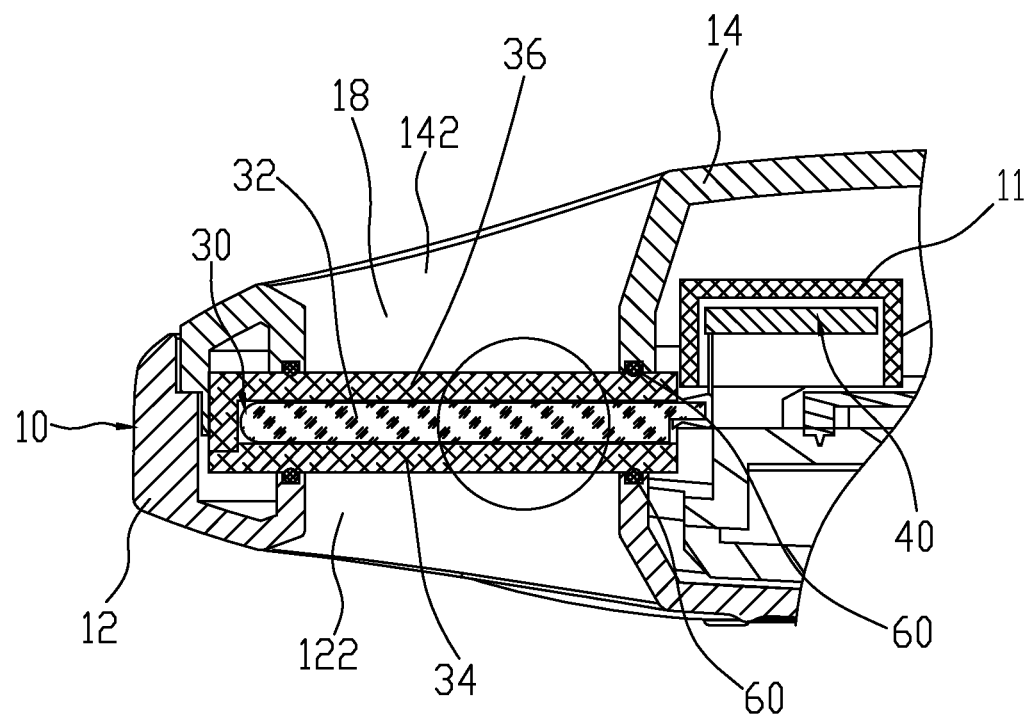
FIG. 5 illustrates another partial sectional view of the LCD shower of the FIG. 1.
Figure 6:
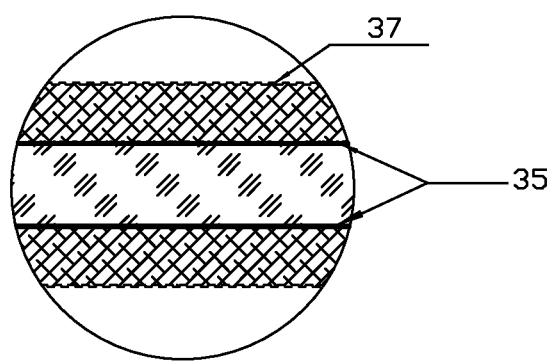
FIG. 6 illustrates the enlargement view of the I part of the FIG. 5
Figure 7:
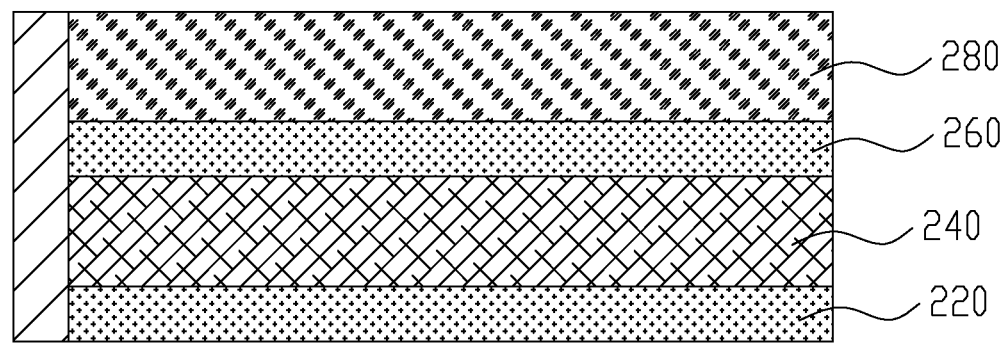
FIG. 7 illustrates the structure of the existing LCD shower.

Please refer to the FIG. 2 to the FIG. 6. The display module 30 is assembled in the throughout hole 18 and connected in the clearance 16. The first light guiding panel 34 is fixedly connected to the periphery of the first through hole 122 to ensure the sealing performance; the second light guiding panel 36 is fixedly connected to the periphery of the second through hole 142 to ensure the sealing performance. The CPU 40 is assembled inside the box body 11. An O ring 60 is disposed between the opposite surfaces of the body 12 and the first light guiding panel 34 of the display module 30 and an O ring 60 is disposed between the opposite surfaces of the cover 14 and the second light guiding panel 36 of the display module 30 to improve the sealing performance of the display module 30 and the body part 10.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. An LCD shower, which includes
   a body part with waterway, the body part including a body and a cover, the body fixed to the cover,
   an information acquisition module,
   a transparent or semitransparent display module,
   a CPU connected to the information acquisition module and the display module and a power module to supply power to the information acquisition module, the display module and the CPU;
   wherein the cover is provided with a front surface facing to the user and a back surface opposite to the front surface,
   wherein the front surface has a first hole and orifices connected to the waterway, and the rear surface has a second hole, the second hole connected to the first hole to form a through hole,
   wherein the display module is assembled in the through hole, the through hole running through the front surface and the back surface of the body part, and
   wherein the display module includes a LCD screen, a first light guiding panel and a second light guiding panel, and the LCD screen is sealed and disposed between the first light guiding panel and the second light guiding panel.

2. The LCD shower according to claim 1, wherein the first light guiding panel and the second light guiding panel are seal adhered or welded together.

3. The LCD shower according to claim 2, wherein the space between the first light guiding panel and the second light guiding panel is filled with transparent solid material.

4. The LCD shower according to claim 3, wherein the opposite sides of the first light guiding panel and the second light guiding panel are separately provided with a layer of uniform concave-convex spots.

5. The LCD shower according to claim 2, wherein the opposite sides of the first light guiding panel and the second light guiding panel are separately provided with a layer of uniform concave-convex spots.

6. The LCD shower according to claim 1, wherein a clearance is disposed between the periphery of the body corresponding to the first hole and the periphery of the cover corresponding to the second hole, and the display module is disposed inside the clearance.

7. The LCD shower according to claim 6, wherein an O ring is disposed between the body and the display module, and an O ring is disposed between the cover and the display module.

8. The LCD shower according to claim 6, wherein the body part further includes a box body to accept the CPU.

9. The LCD shower according to claim 1, wherein the display module is a multicolor backlight guiding display module, and the color of the display module changes according to the water temperature.

10. The LCD shower according to claim 9, wherein the opposite sides of the first light guiding panel and the second light guiding panel are separately provided with a layer of uniform concave-convex spots.

11. The LCD shower according to claim 1, wherein the opposite sides of the first light guiding panel and the second light guiding panel are separately disposed provided with a layer of uniform concave-convex spots.

12. The LCD shower according to claim 1, wherein the power module is disposed in the waterway of the body part to convert the water flow power to electric energy.

* * * * *